US012165405B2

(12) United States Patent  
Drosdeck (10) Patent No.: US 12,165,405 B2
(45) Date of Patent: Dec. 10, 2024

(54) TERRAIN FUSION REAL-TIME RAY TRACING OPTIMIZATION (71) Applicant: LOCKHEED MARTIN CORPORATION, Bethesda, MD (US)

(72) Inventor: Jonathan Andrew Drosdeck, Middletown, CT (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 358 days.

(21) Appl. No.: 17/847,607

(22) Filed: Jun. 23, 2022

(65) Prior Publication Data

US 2023/0419657 A1    Dec. 28, 2023

(51) Int. Cl.
*G06V 20/17*   (2022.01)
*G05D 1/00*    (2006.01)
*G08G 5/00*    (2006.01)

(52) U.S. Cl.
CPC ............. *G06V 20/17* (2022.01); *G05D 1/042* (2013.01); *G08G 5/006* (2013.01)

(58) Field of Classification Search
CPC ...... G06T 7/50–596; G06V 20/10–194; G05D 1/042; G08G 5/006
See application file for complete search history.

(56) References Cited

U.S. PATENT DOCUMENTS

| 8,705,792 | B2 | 4/2014 | James et al. |
| 10,078,335 | B2 | 9/2018 | Mei et al. |
| 2005/0052451 | A1* | 3/2005 | Servantie ................ G06T 15/10 345/419 |
| 2010/0208941 | A1* | 8/2010 | Broaddus ......... G08B 13/19608 382/103 |
| 2012/0274505 | A1* | 11/2012 | Pritt ...................... G01S 13/904 342/25 A |
| 2018/0275658 | A1 | 9/2018 | Iandola et al. |
| 2019/0120964 | A1 | 4/2019 | Luo et al. |
| 2019/0129039 | A1 | 5/2019 | Schubert et al. |

(Continued)

FOREIGN PATENT DOCUMENTS

EP    3 506 212 A1    7/2019

OTHER PUBLICATIONS

"Splay Tree", Wikipedia, Jun. 9, 2022, https://web.archive.org/web/20220609213254/https://en.wikipedia.org/wiki/Splay_tree (16 pages).

(Continued)

*Primary Examiner* — Sean T Motsinger
(74) *Attorney, Agent, or Firm* — Foley & Lardner LLP (57) ABSTRACT

Ray-tracing for terrain mapping is provided. A system of an aerial vehicle can identify points generated from data captured by a sensor of the aerial vehicle. The points can each indicate a respective altitude value of a portion of terrain. The system can determine, based on the altitude values of the points, a threshold altitude of the terrain, and can identify a boundary defined in part based on the threshold altitude of the terrain. The system can generate a terrain map for the terrain based on applying a ray-tracing process to the points. The ray-tracing process can be performed within the boundary, using the points as respective sources and the aerial vehicle as a destination. The system can present a graphical representation of the terrain map in a graphical user interface of the aerial vehicle.

20 Claims, 4 Drawing Sheets

(56) References Cited

U.S. PATENT DOCUMENTS

| | | | |
|---|---|---|---|
| 2019/0139403 A1 | 5/2019 | Alam et al. | |
| 2019/0162856 A1 | 5/2019 | Atalla | |
| 2020/0132822 A1 | 4/2020 | Pimentel et al. | |
| 2020/0393567 A1 | 12/2020 | Schroeter | |
| 2021/0011163 A1 | 1/2021 | Zhang et al. | |
| 2021/0133997 A1* | 5/2021 | Abeywardena | G06V 10/82 |
| 2021/0221398 A1 | 7/2021 | Korobkin et al. | |
| 2021/0223373 A1* | 7/2021 | Korobkin | G01S 17/931 |
| 2022/0046280 A1 | 2/2022 | Iguchi et al. | |
| 2022/0254045 A1* | 8/2022 | Boardman | H04N 23/695 |
| 2022/0301203 A1* | 9/2022 | Ambrus | G01S 17/42 |
| 2022/0335279 A1 | 10/2022 | Tyagi et al. | |
| 2023/0384454 A1 | 11/2023 | Beaurepaire et al. | |
| 2023/0419657 A1* | 12/2023 | Drosdeck | G08G 5/006 |
| 2023/0419658 A1* | 12/2023 | Drosdeck | G06V 20/188 |
| 2024/0160222 A1 | 5/2024 | Verma et al. | |

OTHER PUBLICATIONS

Extended European Search Report on European Patent Application No. 23175040.7 dated Nov. 17, 2023 (10 pages).

Extended European Search Report on European Patent Application No. 23175043.1 dated Nov. 9, 2023 (11 pages).

Lunar et al., "Distributed Ray Tracing for Rendering Voxelized LIDAR Geospatial Data", ERK 2016, Portoroz, Sep. 1, 2016, pp. 55-58.

Notice of Allowance on U.S. Appl. No. 17/847,615 dated Aug. 30, 2024 (12 pages).

* cited by examiner

TERRAIN FUSION REAL-TIME RAY TRACING OPTIMIZATION

FIELD OF THE DISCLOSURE

This disclosure relates to the generation of terrain maps from sensor data.

BACKGROUND

Operators of aerial vehicles, such as airplanes and other manually piloted aircraft, often find representations of terrain surrounding the aerial vehicles useful when performing routine pilot tasks. However, it is challenging to provide real-time representations of terrain maps to aerial vehicle operators due to the excessive computational resources required.

SUMMARY

This technical solution is directed to techniques for real-time ray-tracing optimization for use in generating terrain maps. For example, a vehicle processing system of an aerial vehicle can receive data points representing, in part, altitude values of terrain surrounding the aerial vehicle. From the altitude values provided in the data points, the vehicle processing system can identify a ray-tracing boundary for a ray-tracing process, which can be utilized to generate a terrain map. The vehicle processing system can perform a ray-tracing process on the data points, from the data points as respective sources and the aerial vehicle as a destination. The ray-tracing process can be performed within the volume defined by the boundary, rather than the entire volume between a coordinate of the data points and the aerial vehicle.

The boundary can be defined, for example, based on the greatest detected altitude value of the points. Because the data points represent coordinate data of a portion of the terrain, the ray-tracing volume can be defined in part based on the greatest altitude of the terrain and the lowest altitude of the terrain. By ray-tracing within this bound volume, rather than the entire space between the aerial vehicle and the terrain, the computational resources required are significantly reduced. This allows aerial vehicles to use longer-range sensors in terrain generation processes and allows for real-time terrain generation by the vehicle processing system of the aerial vehicle. Thus, this technical solution can generate real-time terrain maps using data collected from longer-range sensors without unnecessary delay or latency in terrain generation.

An aspect of the present disclosure can relate to a method for ray-tracing for terrain mapping. The method can be performed by one or more processors coupled to memory. The method can include identifying a plurality of points generated from data captured by a sensor of the aerial vehicle. Each of the plurality of points can correspond to a respective altitude value can indicate a respective altitude of a portion of terrain. The method can include determining, based on the respective altitude value of each of the plurality of points, a threshold altitude of the terrain. The method can include identifying a boundary defined in part based on the threshold altitude of the terrain. The method can include generating a terrain map for the terrain based on applying a ray-tracing process to the plurality of points. The ray-tracing process can be performed within the boundary from the plurality of points as respective sources to the aerial vehicle as a destination. The method can include presenting a graphical representation of the terrain map in a graphical user interface of the aerial vehicle.

In some implementations, the sensor can be a light-detection and ranging sensor and the data includes LiDAR signals. In some implementations, the LiDAR signals can include signals received from distances ranging between 1 km from the aerial vehicle to 10 km from the aerial vehicle. In some implementations, the method can include further including determining, based on the ray-tracing process, a plurality of hits on the terrain. In some implementations, determining the plurality of hits can include performing a log odds computation based on a result of the ray-tracing process for the plurality of points. In some implementations, identifying the plurality of points can include receiving the data captured by a plurality of sensors.

In some implementations, identifying the boundary can include determining, based on the plurality of points, a maximum altitude value of the terrain as the threshold altitude. In some implementations, a maximum distance that ray-tracing can be to be performed is based on a difference between the threshold altitude of the terrain and a second threshold of the terrain. In some implementations, the threshold altitude can be a maximum altitude of the plurality of points. In some implementations, the second threshold can be a minimum altitude of the plurality of points. In some implementations, the terrain map can be presented prior to the aerial vehicle navigating over the terrain.

An aspect of the present disclosure can relate to a system for ray-tracing for terrain mapping. The system can include one or more processors coupled to memory of an aerial vehicle. The system can identify a plurality of points generated from data captured by a sensor of the aerial vehicle. Each of the plurality of points can correspond to a respective altitude value can indicate a respective altitude of a portion of terrain. The system can determine, based on the respective altitude value of each of the plurality of points, a threshold altitude of the terrain. The system can identify a boundary defined in part based on the threshold altitude of the terrain. The system can generate a terrain map for the terrain based on applying a ray-tracing process to the plurality of points. The ray-tracing process can be performed within the boundary, from the plurality of points as respective sources and to the aerial vehicle as a destination. The system can present a graphical representation of the terrain map in a graphical user interface of the aerial vehicle.

In some implementations, the sensor can be a light-detection and ranging sensor and the data includes LiDAR signals. In some implementations, the LiDAR signals can include signals received from distances ranging between 1 km from the aerial vehicle to 10 km from the aerial vehicle. In some implementations, the system can determine, based on the ray-tracing process, a plurality of hits on the terrain. In some implementations, determining the plurality of hits can include performing a log odds computation based on a result of the ray-tracing process for the plurality of points. In some implementations, identifying the plurality of points can include receiving the data captured by a plurality of sensors.

In some implementations, identifying the boundary can include determining, based on the plurality of points, a maximum altitude value of the terrain as the threshold altitude. In some implementations, a maximum distance that ray-tracing can be to be performed is based on a difference between the threshold altitude of the terrain and a second threshold of the terrain. In some implementations, the threshold altitude can be a maximum altitude of the plurality of points. In some implementations, the second threshold can be a minimum altitude of the plurality of points. In some implementations, the terrain map can be presented prior to the aerial vehicle navigating over the terrain.

An aspect of the present disclosure can relate to an aerial vehicle. The aerial vehicle can include a sensor, and one or more processors coupled to memory. The one or more processors can identify a plurality of points generated from data captured by the sensor. Each of the plurality of points can correspond to a respective altitude value indicating a respective altitude of a portion of terrain. The one or more processors can determine, based on the respective altitude value of each of the plurality of points, a threshold altitude of the terrain. The one or more processors can identify a boundary defined in part based on the threshold altitude of the terrain. The one or more processors can generate a terrain map for the terrain based on applying a ray-tracing process to the plurality of points, the ray-tracing process performed within the boundary from the plurality of points as respective sources to the aerial vehicle as a destination. The one or more processors can present a graphical representation of the terrain map in a graphical user interface of the aerial vehicle.

In some implementations, the sensor is a light-detection and ranging (LiDAR) sensor and the data comprises LiDAR signals.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. Aspects can be combined and it will be readily appreciated that features described in the context of one aspect of the invention can be combined with other aspects. Aspects can be implemented in any convenient form. For example, by appropriate computer programs, which can be carried on appropriate carrier media (computer readable media), which can be tangible carrier media (e.g. disks or other non-transitory storage media) or intangible carrier media (e.g. communication signals). Aspects can also be implemented using suitable apparatus, which can take the form of programmable computers running computer programs arranged to implement the aspects. As used in the specification and in the claims, the singular form of "a," "an," and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings.

DETAILED DESCRIPTION

In the following detailed description, reference is made to the accompanying drawings, which form a part hereof. In the drawings, similar symbols typically identify similar components, unless context indicates otherwise. The illustrative implementations described in the detailed description, drawings, and claims are not meant to be limiting. Other implementations can be utilized, and other changes can be made, without departing from the spirit or scope of the subject matter presented. It will be readily understood that the aspects of the present disclosure, as generally described herein, and illustrated in the figures, can be arranged, substituted, combined, and designed in a wide variety of different configurations, all of which are explicitly contemplated and make part of this disclosure.

The systems, apparatuses, and methods described herein allow for real-time ray-tracing optimization for use in generating terrain maps. It can be challenging to perform ray-tracing techniques due to excessive utilization of computational resources, making it impracticable to implement terrain mapping using real-time sensor data captured, for example, from long-range LiDAR sensors. This technical solution performs ray-tracing for terrain mapping in aerial vehicle environments by defining a boundary based on the altitude of the terrain. These boundaries can define a volume in which ray-tracing is performed, from the LiDAR points as a source to the aerial vehicle as a destination. Doing so reduces the amount of ray-tracing required, significantly improving the computational performance of the ray-tracing process. This allows an aerial vehicle, or data processing system thereof, to generate real-time terrain maps using ray-tracing from data captured by both short and long-range LiDAR sensors.

Figure 1:
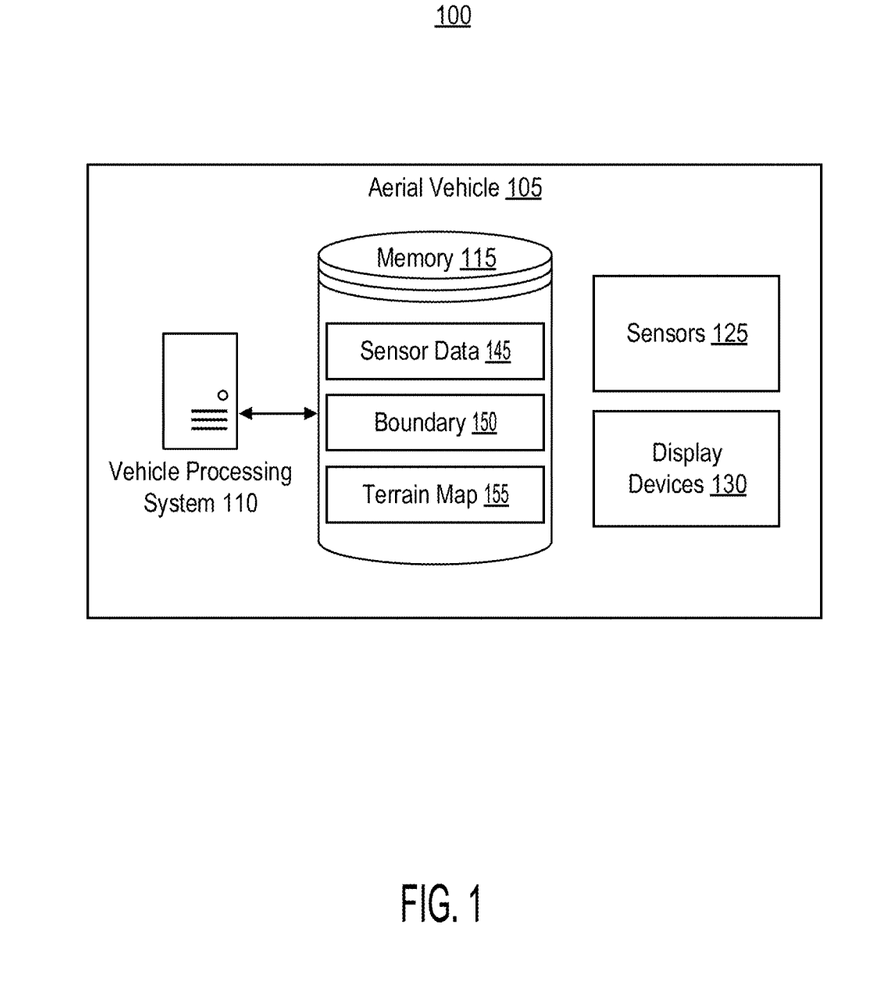
FIG. 1 illustrates a block diagram of a system for ray-tracing for terrain map generation, in accordance with one or more implementations.

Referring now to FIG. 1, illustrated is a block diagram of an example system 100 ray-tracing for terrain map generation, in accordance with one or more implementations. In brief overview, the system 100 can include at least one aerial vehicle 105. The aerial vehicle 105 can include at least one vehicle processing system 110, at least one memory 115, one or more sensors 125 and one or more display devices 130. The memory 115 can store sensor data 145, boundaries 150, and a terrain map 155. The vehicle processing system 110, the memory 115, the sensors 125, and one or more display devices 130 can be connected or communicatively coupled with one another. The vehicle processing system 110, the memory 115, the sensors 125, and the one or more display devices 130 can be implemented at least in part using one or more of the components of the computer system 400 described in connection with FIG. 4.

The aerial vehicle 105 can be any type of aerial vehicle, such as an airplane, a helicopter, a drone, a vertical take-off and landing (VTOL) aircraft, or any other type of aerial vehicle 105. The aerial vehicle 105 can be operated by one or more pilots, for example, using the vehicle control devices 135. The aerial vehicle 105 can be equipped with any type of device or system that can be used to complete a task or mission that has been assigned to the aerial vehicle 105. The aerial vehicle 105 can include one or more communications interfaces (not pictured), via which the aerial vehicle 105 or the vehicle processing system 110 can transmit information, including any of the information used in the techniques described herein.

The sensors 125 can be mounted on the interior or the exterior of the aerial vehicle 105. Non-limiting examples of the sensors 125 include LiDAR sensors, visible light sensors (e.g., cameras, video capture devices, etc.), infrared light sensors, accelerometers, gyroscopes, magnetometers, elevation sensors, pressure sensors, temperature sensors, force sensors, proximity sensors, radar sensors, angle-of-attack sensors, global positioning system (GPS) sensors, thermal infrared cameras, and thermal imaging cameras, among others. Sensor information can be retrieved from the sensors 125 by the vehicle processing system 110. In some implementations, one or more of the sensors 125 can provide sensor data 145 periodically (e.g., in a batch transmission, etc.) to the vehicle processing system 110. In some implementations, one or more of the sensors 125 can provide sensor data 145 to the vehicle processing system 110 upon receiving a corresponding request for sensor data 145 from the vehicle processing system 110. The sensors 125 can provide raw LiDAR measurements, which can be stored in the memory 115 as part of the sensor data 145. In some implementations, the vehicle processing system 110 can retrieve or receive raw data from the sensors 125, and store the raw data as part of the sensor data 145.

The aerial vehicle 105 can include various output devices, such as the display devices 130. The display devices 130 can include any type of device capable of presenting information to an operator of the aerial vehicle 105. The display devices 130 can be positioned within the aerial vehicle 105 such that they can be accessed by the operator during operation of the aerial vehicle 105. The display devices 130 can include devices that present specific sensor information, such as speed, direction, velocity, or location. The display devices 130 can present information relating to the terrain map 155. For example, the display devices 130 can display a two-dimensional (2D) or three-dimensional (3D) representation of the terrain map 155, which can be generated using the techniques described herein. The display devices 130 can include general display devices that can present information, such as the sensor data 145, the boundaries 150, or the terrain map 155, as described in connection with the present techniques. The display devices 130 can include an electronic flight instrument system (EFIS), which can include one or more primary flight displays, one or more multi-function displays, or other displays. The display devices 130 can include liquid crystal displays (LCDs), light-emitting diode (LED) displays, organic light-emitting diode (OLED) displays, bi-stable displays (e.g., e-ink, etc.), among others.

The memory 115 can be a computer-readable memory that can store or maintain any of the information described herein. The memory 115 can maintain one or more data structures, which can contain, index, or otherwise store each of the values, pluralities, sets, variables, vectors, numbers, or thresholds described herein. The memory 115 can be accessed using one or more memory addresses, index values, or identifiers of any item, structure, or region maintained in the memory 115. The memory 115 can be accessed by the vehicle processing system 110. In some implementations, other computing devices present on the aerial vehicle 105 can access the memory 115. The vehicle processing system 110 can store the results of any or all computations in one or more data structures in the memory 115, such that the data structures are indexed or identified with appropriate values for later access.

The memory 115 can store sensor data 145, for example, in one or more data structures indexed by an appropriate value, such as a timestamp corresponding to when a respective portion of the sensor data 145 was captured. The sensor data 145 can be stored by the vehicle processing system 110 upon receiving the sensor data 145 from the sensors 125. The sensor data 145 can include LiDAR measurements, or points, captured from LiDAR sensors. For example, the sensor data 145 can include one or more LiDAR coordinate points in a three-dimensional coordinate space (e.g., an X, Y, Z coordinate space, etc.). The LiDAR points in the sensor data 145 can be raw measurements that can result from an actual LiDAR signal provided by the sensors 125, or a spurious return based on the environment. The ray-tracing techniques described herein can be used to determine whether a LiDAR point is in fact an actual hit on terrain or a spurious return. The sensor data 145 can also include data from other types of sensors 125, including location sensors (e.g., GPS coordinates of the aerial vehicle 105), aerial vehicle 105 velocity, acceleration, or orientation, among other types of sensor data 145. Sets of sensor data 145 can be generated for each scan of a region for which a terrain map 155 is to be generated.

The memory 115 can store one or more boundaries 150, for example, in one or more data structures. The boundaries 150 can be utilized by the vehicle processing system 110 to determine a volume in which ray-tracing is to be performed. The boundaries 150 can be determined, for example, based on the altitude of terrain as indicated by the LiDAR measurements in the sensor data 145. The boundaries 150 can be generated using the techniques described herein for each scan of a particular region of terrain while the aerial vehicle 105 is operating. The boundaries 150 can be stored in association with a respective set of sensor data 145 corresponding to the scan. In some implementations, a boundary 150 can be a maximum coordinate value of the LiDAR measurements in a particular scan (e.g., a maximum Z value). The vehicle processing system 110 can generate a boundary 150 using the techniques described herein responsive to the sensors 125 scanning a portion of terrain.

The memory 115 can store a terrain map 155, for example, in one or more data structures. The terrain map 155 can be a two-dimensional, 2.5D (e.g., two-dimensional 2D graphical projections and similar techniques that simulate the appearance of being three-dimensional when in fact they are not, such as a heatmap, etc.), or three-dimensional model of terrain, which is generated from the sensor data 145 using the techniques described herein. The sensor data 145 can include LiDAR points that are spurious returns as well as legitimate returns from the environment. The terrain map 155 can be generated from the coordinates of LiDAR points that are determined to be legitimate hits, and not spurious returns. The vehicle processing system 110 can utilize the processes described herein to perform real-time ray-tracing on the sensor data 145, to identify which points are legitimate hits and which points are spurious, and filter the spurious returns to generate the terrain map 155. The terrain map 155 can be presented to an operator of the aerial vehicle 105 via the display devices 130. The vehicle processing system 110 can generate or update the terrain map 155, for example, each time a LiDAR scan is performed. In some implementations, the vehicle processing system 110 can expand the terrain map 155 as additional scans are performed and processed using the techniques described herein.

The vehicle processing system 110 can include at least one processor and a memory (e.g., a processing circuit). The memory can store processor-executable instructions that, when executed by processor, cause the processor to perform one or more of the operations described herein. The processor can include a microprocessor, an application-specific integrated circuit (ASIC), a field-programmable gate array (FPGA), etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions can include code from any suitable computer programming language. The vehicle processing system 110 can communicate with any of the components of the aerial vehicle 105, including the memory 115, the sensors 125, the display devices 130, and one or more communication interfaces (not pictured), to perform the operations described herein. The vehicle processing system 110 can include any or all of the components and perform any or all of the functions of the computer system 400 described in connection with FIG. 4.

Referring now to the operations of the vehicle processing system 110, the vehicle processing system 110 can identify one or more points (e.g., LiDAR points) generated from the sensor data 145 captured by the sensor 125 of the aerial vehicle 105. The sensor data 145 captured by the sensors 125 can include LiDAR signals, which can be used to generate one or more points in a 3D Euclidean coordinate space. The LiDAR signals can include signals received from LiDAR sensors that terrain at distances ranging between 1 km from the aerial vehicle 105 to 10 km from the aerial vehicle 105, for example. Identifying the points can include receiving the sensor data 145 captured by the sensors 125, and storing the data in the memory 115. The sensor data 145 can include one or more data points, which can be multi-dimensional data points indicating various attributes of a point on the terrain that was scanned by the sensors 125. For example, each point can include a three-dimensional coordinate (e.g., (X, Y, Z) coordinates, etc.). At least one of these coordinate values can correspond to the altitude of a position of the terrain. For example, the Z-coordinate of the point can correspond to a respective altitude of the portion of the terrain that the corresponding LiDAR signal returned from.

The vehicle processing system 110 can determine, based on the respective altitude value of each of the one or more identified points, a threshold altitude of the terrain. The threshold value can be determined by accessing and analyzing the coordinates of a set of points corresponding to a LiDAR scan of a portion of terrain. As described above, each of the points can include a coordinate value that corresponds to an altitude of the terrain that the respective point measures. The vehicle processing system 110 can iterate through each of the points of the LiDAR scan, and identify the greatest altitude value in the set of points by comparing the coordinate values of the points to one another. In some implementations, the greatest altitude value can be calculated as the points are captured by the sensors 125. For example, a register or memory variable can be initialized to the altitude value of the first point captured by the sensors 125 when performing a LiDAR scan, which can be compared to the altitude of each additional point that is captured. If a captured point has an altitude value that is greater than the current greatest altitude value stored in the variable, the vehicle processing system 110 can replace the variable with the altitude value of the captured point. This process can be repeated for each point as it is captured, or after the points have been captured, by the sensors 125.

The vehicle processing system 110 can perform preliminary filtering on the captured points prior to determining the threshold value. For example, the vehicle processing system 110 can identify and filter anomalous points, such as points having impossible altitude values for regular terrain (e.g., sudden spikes or dips in altitude relative to surrounding points that would be impossible or do not exist in natural terrain). Such points can result from transient objects passing between the aerial vehicle 105 and the terrain, such as birds or clouds. The vehicle processing system 110 can perform the filtering process upon capturing the points of a LiDAR scan of the terrain. Other filtering conditions or pre-processing operations are also possible, for example, such as filtering points that have coordinates that fall outside a predetermined region or distance from the aerial vehicle 105.

The vehicle processing system 110 can determine multiple thresholds for LiDAR scans. For example, the vehicle processing system 110 can determine a first (e.g., upper) threshold as the maximum altitude of the terrain as represented by the points of a LiDAR scan, and can determine a second (e.g., lower) threshold as a minimum altitude of the terrain as represented by the points of the LiDAR scan. The vehicle processing system 110 can also determine the lower or upper thresholds based on one or more predetermined rules (e.g., a predetermined minimum altitude threshold, a predetermined maximum threshold, etc.). The vehicle processing system 110 can also utilize the thresholds from one or more previous LiDAR scans for a current LiDAR scan when performing the threshold altitude can be a maximum altitude of the plurality of points.

The vehicle processing system 110 can identify a boundary 150 defined in part based on the threshold altitude of the terrain. As described herein, the LiDAR points captured by the sensors 125 can include a point in a three-dimensional coordinate space (e.g., (X, Y, Z), etc.), with one coordinate of a point indicating an expected altitude of the portion of the terrain to which that point corresponds. The vehicle processing system 110 can define a boundary 150 for a set of points (e.g., one or more LiDAR scans of a region of terrain) by setting the identified threshold as the boundary 150 for those points. The boundary 150 can be utilized in a ray-tracing process, as described herein, which can be utilized to produce a terrain map 155 from the set of LiDAR points. If multiple thresholds have been identified (e.g., upper or lower thresholds, other thresholds, etc.), the vehicle processing system 110 can identify multiple boundaries 150 for the set of points. For example, the vehicle processing system 110 can determine that a maximum altitude threshold is an upper boundary 150 for the set of points, and the minimum altitude threshold is a lower boundary 150 for the set of points. The boundaries 150 can be defined within the three dimensional coordinate space of the sets of points captured by the sensors 125.

The boundaries 150 for a set of points can define a volume in which a ray-tracing process can be performed. Generally, this volume is less than the entire volume between the aerial vehicle 105 and the terrain in the 3D coordinate space of the points captured by the sensors 125. The reduced volume can be utilized to generate terrain maps 155 for aerial vehicles 105 because the space between the aerial vehicle 105 and the highest altitude of the terrain is most likely empty space. For the purposes of ray-tracing, these empty portions can be ignored above the boundary 150 (e.g., above the highest altitude value of the terrain indicated in the points captured by the sensors 125). Therefore, the maximum distance that ray-tracing can be performed can be limited by the boundary 150. Additional boundaries 150 can also be determined, for example, based on the scanning area of the sensors 125, or based on predetermined boundary rules which can be stored in the memory 115 of the aerial vehicle 105. An example of a reduced ray-tracing volume created by the boundary 150 is shown in FIG. 2.

Figure 2:
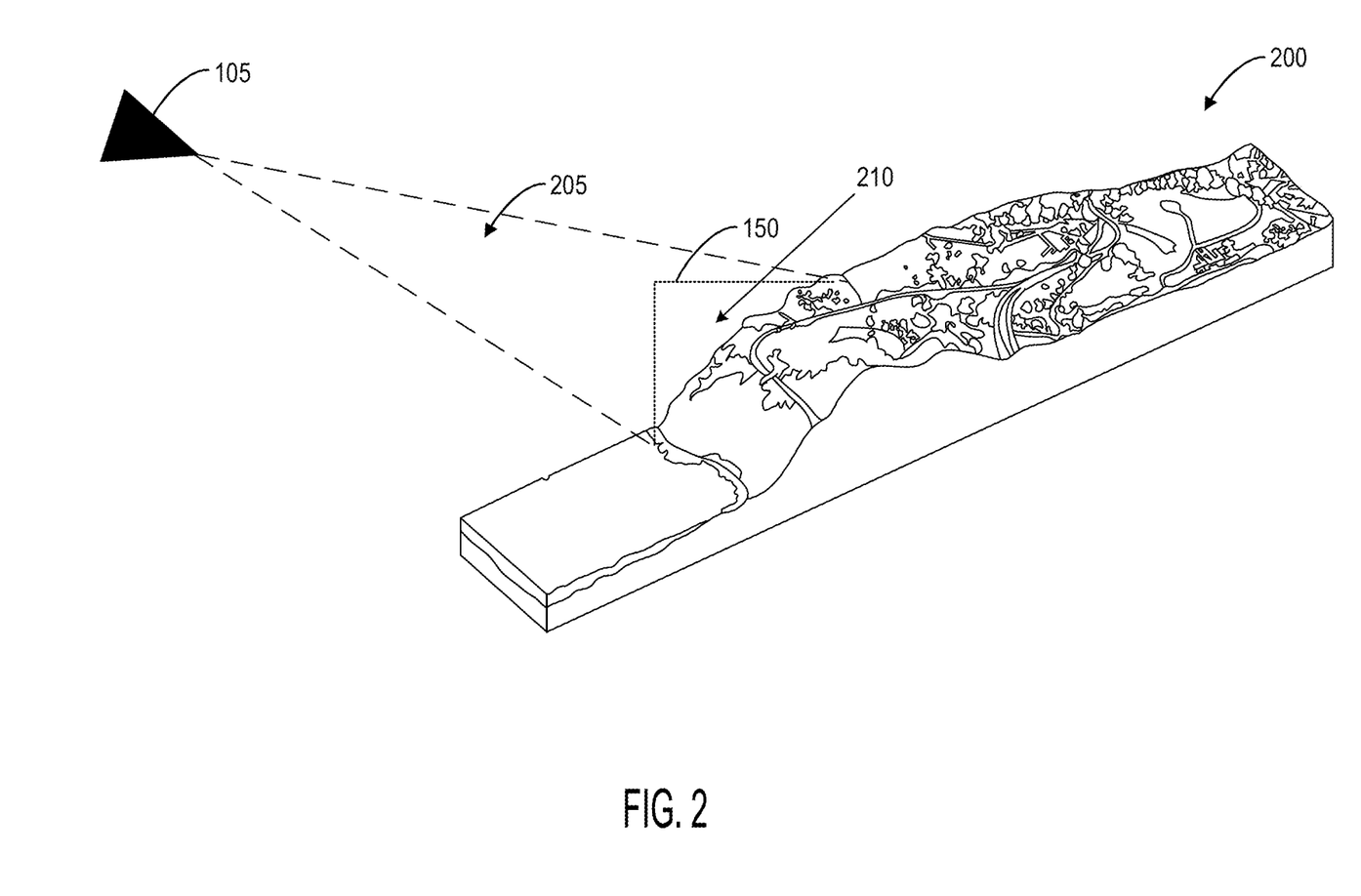
FIG. 2 illustrates an example representation of a boundary generated based on terrain altitude, in accordance with one or more implementations.

Referring to FIG. 2, and others, illustrated is an example representation of a boundary 150 generated based on terrain altitude, in accordance with one or more implementations. As shown in FIG. 2, the aerial vehicle 105 can transmit LiDAR signals in a scanning volume 205, which strike the terrain 200 and bounce back to the sensors 125, which record corresponding sensor data 145 (e.g., one or more points). Based on the altitude values indicated in these points, the vehicle processing system 110 can identify the boundary 150. As shown, the boundary 150 defines the ray-tracing volume 210, which is significantly smaller than the scanning volume 205 (e.g., which can be a cone or another type of three-dimensional volume). The reduced ray-tracing volume 210 requires far less computational resources to process, and therefore enables real-time ray-tracing capability as the aerial vehicle 105 navigates over the terrain 200. Although the boundary 150 is shown as a square boundary 150 in FIG. 2, the boundary 150 can be any shape, and include any number of sides, contours, or dimensions based on predetermined settings or characteristics of the sensors 125 (e.g., a number of sensors, etc.). If multiple LiDAR sensors are used, a respective boundary 150 can be generated for each sensor 125 that captures points used to generate a terrain map 155.

Referring back to FIG. 1, the vehicle processing system 110 can generate a terrain map 155 for the terrain by applying a ray-tracing process to the points captured by the sensors 125. If a filtering process is applied to the sensor data 145 to generate a filtered set of points from a LiDAR scan, the ray-tracing process can be applied to the filtered points. The ray-tracing process can be applied to the points to determine which of the points correspond to "hits," or actual terrain measurements, and which points are spurious returns. Spurious returns can result from characteristics of the terrain, such as a reflective surface that causes a LiDAR signal to reflect along a multipath, resulting in a measurement that is inconsistent with the actual portion of the terrain where the LiDAR signal was directed. Diffuse reflection from the terrain can also contribute to spurious sensor data 145.

To identify which of the LiDAR measurements (e.g., points) represent useful readings, rather than spurious data, a ray-tracing process can be performed from each point as a respective source toward the aerial vehicle 105 as a destination. Ray tracing emulates the way photons reflect in the environment (e.g., bouncing off surfaces in a diffuse or specular manner, etc.). As such, ray-tracing can be used to model the LiDAR signals emitted by the sensors 125. Unlike implementations that do not implement the present techniques, which perform ray-tracing from the source (e.g., the sensors 125 of the aerial vehicle 105) to a destination (e.g., the coordinate point of a LiDAR measurement), the vehicle processing system 110 can perform reverse ray-tracing from the destination (e.g., the positions of the points captured by the sensors 125) towards the source of the signals (e.g., the sensors 125 of the aerial vehicle 105). Additionally, the vehicle processing system 110 can perform the ray-tracing process only until the boundary 150 for the set of LiDAR points is reached, significantly reducing the amount of ray-tracing computations that must be performed. This effectively reduces the maximum distance to be ray-traced to the difference between the highest and lowest elevation LiDAR points in the scanned region of terrain.

When performing ray-tracing, the three-dimensional space can be sub-divided into three-dimensional cells. Each cell can be associated with a hit count, which can be updated during the ray-tracing process based on a log-odds process. The log odds process can be used as part of the ray-tracing process to determine a number of hit counts per cell in the three-dimensional space. Cells that are associated with a hit count that is greater than a predetermined threshold can be considered a "hit," or a representing an actual terrain measurement, while cells having hit counts that do not satisfy that threshold can be considered spurious, and therefore discarded. The techniques described herein can perform this process within the volume defined by the boundary 150, rather than then entire volume between the aerial vehicle 105 and the terrain. Log odds can be used as method to determine if a cell within the grid actually contains a real object or portion of terrain. Every time the cell is "hit," a counter for that cell is incremented. Additionally, every time a cell gets "passed through" (e.g., no hit on terrain is detected), the counter for that cell is decremented. If, after performing these techniques for the LiDAR points, the counter for a particular cell is greater than a predetermined threshold, the cell is considered occupied (e.g., the cell corresponds to a real hit rather than a spurious return).

The output of the process can be a set of points that register as corresponding "hits," or actual measurements from the terrain. The data points that correspond to hits can then be utilized to generate the terrain map 155. The terrain map 155 can be a 2.5D representation of the LiDAR data points that correspond to hits, with the X and Y values of the LiDAR hits mapped to corresponding X and Y values of the terrain map 155, and a color value being mapped to the altitude of the terrain. The terrain map 155 can also be a 3D model, or mesh, which can be generated in real-time based on the LiDAR points. For example, the LiDAR points that correspond to hits can be represented as vertices in the mesh, and adjacent vertices can be connected with edges to form polygons, which construct a multi-faced polygonal surface mesh based on the X, Y, and Z coordinates of each hit point. This mesh can be stored as part of the terrain map 155. Other representations of the LiDAR points making up the terrain map 155 are also possible. The vehicle processing system 110 can update the terrain map 155 with additional hit points from LiDAR scans as they are processed using the techniques described herein.

After generating the terrain map 155, the vehicle processing system 110 can present a graphical representation (e.g., a rendering) of the terrain map 155 in a graphical user interface of the aerial vehicle 105. The graphical representation of the terrain map 155 can be a 2.5D rendering or a 3D rendering of the terrain map 155. The graphical user interface that includes the graphical representation of the terrain map 155 can be displayed on the display devices 130. The graphical representation of the terrain map 155 can be updated at the display devices 130 in real-time, or as new sensor data 145 is captured by the sensors 125. As the LiDAR scans the environment in front of the aerial vehicle 105, the terrain map 155 can be generated and presented prior to the aerial vehicle 105 navigating over the terrain, in real-time. The graphical representation of the terrain map 155 can be an overlay of the terrain map 155. For example, the overlay can be aligned with or otherwise overlaid (e.g., semi-transparently, etc.) in a 3D (or 2.5D) rendering over another 2D map of the region. The overlay and the 2D map can be communicated to and presented by the display devices 130 in real-time, near real-time, or as the sensor data 145 is captured by the sensors 145 and processed by the vehicle processing system 110.

Figure 3:
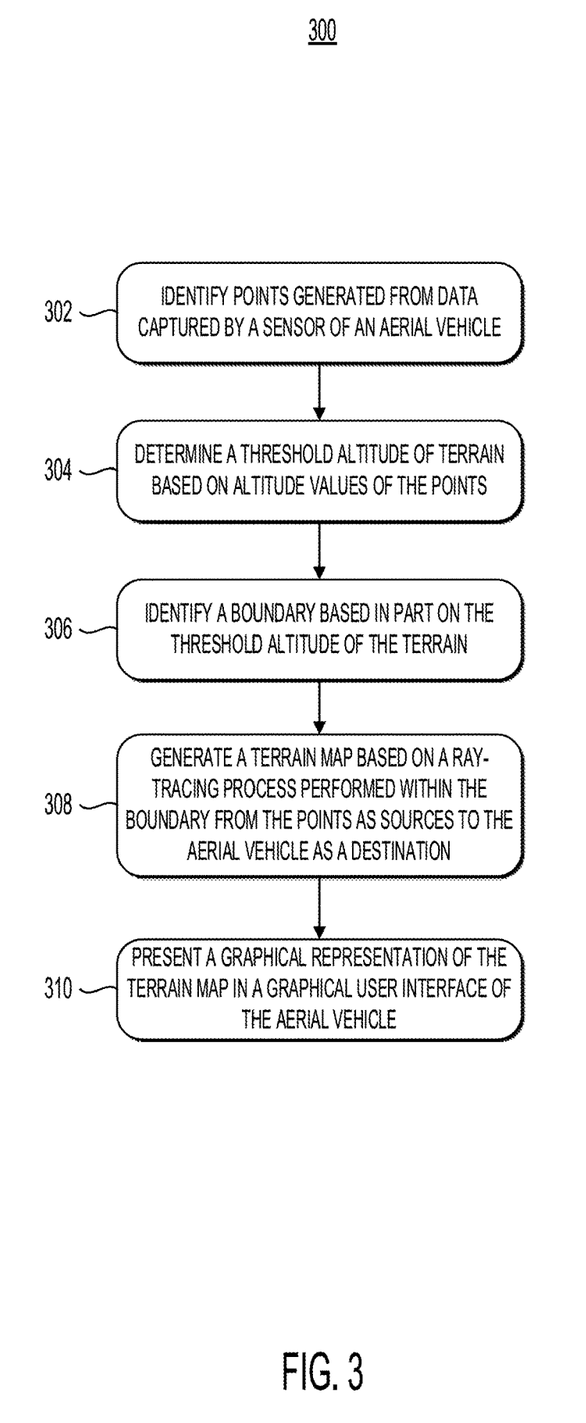
FIG. 3 illustrates a flow diagram of a method for ray-tracing for terrain map generation, in accordance with one or more implementations.

Referring now to FIG. 3, depicted is an illustrative flow diagram of a method 300 for ray-tracing for terrain map generation, in accordance with one or more implementations. The method 300 can be executed, performed, or otherwise carried out by the vehicle processing system 110, the computer system 400 described herein in conjunction with FIG. 4, or any other computing devices described herein. In brief overview, the method 300 can include identifying points generated from data captured by a sensor of an aerial vehicle (ACT 302), determining a threshold altitude of terrain based on altitude values of the points (ACT 304), identifying a boundary based in part on the threshold altitude of the terrain (ACT 306), generating a terrain map based on a ray-tracing process performed within the boundary from the points as sources to the aerial vehicle as a destination (ACT 308), and presenting a graphical representation of the terrain map in a graphical user interface of the aerial vehicle (ACT 310).

In further detail, the method 300 can include identifying points generated from data (e.g., the sensor data 145) captured by a sensor (e.g., one or more of the sensors 125) of an aerial vehicle (e.g., the aerial vehicle 105) (ACT 302). The sensor data captured by the sensors can include LiDAR signals, which can be used to generate one or more three-dimensional points of. The LiDAR signals can include signals received from LiDAR sensors that terrain at distances ranging between 1 km from the aerial vehicle to 10 km from the aerial vehicle. Identifying the points can include receiving the sensor data captured by the sensors. The sensor data can include one or more sensor data points, which can be multi-dimensional sensor data points indicating various attributes of a point on the terrain that was scanned by the sensors. For example, each point can include a three-dimensional coordinate (e.g., (X, Y, Z) coordinates, etc.). At least one of these coordinate values can correspond to the altitude of a position of the terrain. For example, the Z-coordinate of the point can correspond to a respective altitude of the portion of the terrain that the corresponding LiDAR signal returned from.

The method 300 can include determining a threshold altitude of terrain based on altitude values of the points (ACT 304). The threshold value can be determined by accessing and analyzing the coordinates of a set of points corresponding to a LiDAR scan of a portion of terrain. As described above, each of the points can include a coordinate value that corresponds to an altitude of the terrain that the respective point measures. The vehicle processing system can iterate through each of the points of the LiDAR scan, and identify the greatest altitude value in the set of points by comparing the coordinate values of the points to one another. In some implementations, the greatest altitude value can be calculated as the points are captured by the sensors. For example, a register or memory variable can be initialized to the altitude value of the first point captured by the sensors when performing a LiDAR scan, which can be compared to the altitude of each additional point that is captured. If a captured point has an altitude value that is greater than the current greatest altitude value stored in the variable, the vehicle processing system can replace the variable with the altitude value of the captured point. This process can be repeated for each point as it is captured, or after the points have been captured, by the sensors.

The vehicle processing system can perform preliminary filtering on the captured points prior to determining the threshold value. For example, the vehicle processing system can identify and filter anomalous points, such as points having impossible altitude values for regular terrain (e.g., sudden spikes or dips in altitude relative to surrounding points that would be impossible in natural terrain, etc.). Such points can result from transient objects passing between the aerial vehicle and the terrain, such as birds or clouds. The vehicle processing system can perform the filtering process upon capturing the points of a LiDAR scan of the terrain. Other filtering conditions or pre-processing operations are also possible, for example, such as filtering points that have coordinates that fall outside a predetermined region or distance from the aerial vehicle.

The vehicle processing system can determine multiple thresholds for LiDAR scans. For example, the vehicle processing system can determine a first (e.g., upper) threshold as the maximum altitude of the terrain as represented by the points of a LiDAR scan, and can determine a second (e.g., lower) threshold as a minimum altitude of the terrain as represented by the points of the LiDAR scan. The vehicle processing system can also determine the lower or upper thresholds based on one or more predetermined rules (e.g., a predetermined minimum altitude threshold, a predetermined maximum threshold, etc.). The vehicle processing system can also utilize the thresholds from one or more previous LiDAR scans for a current LiDAR scan when performing the threshold altitude can be a maximum altitude of the plurality of points.

The method 300 can include identifying a boundary (e.g., the boundary 150) based in part on the threshold altitude of the terrain (ACT 306). As described herein, the LiDAR points captured by the sensors can include a point in a three-dimensional coordinate space (e.g., (X, Y, Z), etc.), with one coordinate of a point indicating an expected altitude of the portion of the terrain to which that point corresponds. The vehicle processing system can define a boundary for a set of points (e.g., one or more LiDAR scans of a region of terrain) by setting the identified threshold as the boundary for those points. The boundary can be utilized in a ray-tracing process, as described herein, which can be utilized to produce a terrain map from the set of LiDAR points. If multiple thresholds have been identified (e.g., upper or lower thresholds, other thresholds, etc.), the vehicle processing system can identify multiple boundaries for the set of points. For example, the vehicle processing system can determine that a maximum altitude threshold is an upper boundary for the set of points, and the minimum altitude threshold is a lower boundary for the set of points. The boundaries can be defined within the three dimensional coordinate space of the sets of points captured by the sensors.

The boundaries for a set of points can define a volume in which a ray-tracing process can be performed. Generally, this volume is less than the entire volume between the aerial vehicle and the terrain in the 3D coordinate space of the points captured by the sensors. The reduced volume can be utilized to generate terrain maps for aerial vehicles because the space between the aerial vehicle and the highest altitude of the terrain is most likely empty space. For the purposes of ray-tracing, these empty portions can be ignored above the boundary (e.g., above the highest altitude value of the terrain indicated in the points captured by the sensors). Therefore, the maximum distance that ray-tracing can be performed can be limited by the boundary. Additional boundaries can also be determined, for example, based on the scanning area of the sensors, or based on predetermined boundary rules which can be stored in the memory of the aerial vehicle.

The method 300 can include generating a terrain map (e.g., the terrain map 155) based on a ray-tracing process performed within the boundary from the points as sources to the aerial vehicle as a destination (ACT 308). If a filtering process is applied to the sensor data to generate a filtered set of points from a LiDAR scan, the ray-tracing process can be applied to the filtered points. The ray-tracing process can be applied to the points to determine which of the points correspond to "hits," or actual terrain measurements, and which points are spurious returns. Spurious returns can result from characteristics of the terrain, such as a reflective surface that causes a LiDAR signal to reflect along a multipath, resulting in a measurement that is inconsistent with the actual portion of the terrain where the LiDAR signal was directed. Diffuse reflection from the terrain can also contribute to spurious sensor data.

To identify which of the LiDAR measurements (e.g., points) represent useful readings, rather than spurious data, a ray-tracing process can be performed from each point as a respective source toward the aerial vehicle as a destination. Ray tracing emulates the way photons reflect in the environment (e.g., bouncing off surfaces in a diffuse or specular manner, etc.). As such, ray-tracing can be used to model the LiDAR signals emitted by the sensors. Unlike implementations that do not implement the present techniques, which perform ray-tracing from the source (e.g., the sensors of the aerial vehicle) to a destination (e.g., the coordinate point of a LiDAR measurement), the vehicle processing system can perform ray-tracing from the destination (e.g., the points captured by the sensors) towards the source (e.g., the aerial vehicle). Additionally, the vehicle processing system can perform the ray-tracing process only until the boundary for the set of LiDAR points is reached, significantly reducing the amount of ray-tracing computations that must be performed. This effectively reduces the maximum distance to be ray-traced to the difference between the highest and lowest elevation LiDAR points in the scanned region of terrain.

When performing ray-tracing, the three-dimensional space can be sub-divided into three-dimensional cells. Each cell can be associated with a hit count, which can be updated during the ray-tracing process based on a log-odds process. The log odds process can be used as part of the ray-tracing process to determine a number of hit counts per cell in the three-dimensional space. Cells that are associated with a hit count that is greater than a predetermined threshold can be considered a "hit," or a representing an actual terrain measurement, while cells having hit counts that do not satisfy that threshold can be considered spurious, and therefore discarded. The techniques described herein can perform this process within the volume defined by the boundary, rather than then entire volume between the aerial vehicle and the terrain.

The output of the process can be a set of points that register as corresponding "hits," or actual measurements from the terrain. The data points that correspond to hits can then be utilized to generate the terrain map. The terrain map can be a 2.5D representation of the LiDAR data points that correspond to hits, with the X and Y values of the LiDAR hits mapped to corresponding X and Y values of the terrain map, and a color value being mapped to the altitude of the terrain. The terrain map can also be a 3D model, or mesh, which can be generated in real-time based on the LiDAR points. For example, the LiDAR points that correspond to hits can be represented as vertices in the mesh, and adjacent vertices can be connected with edges to form polygons, which construct a multi-faced polygonal surface mesh based on the X, Y, and Z coordinates of each hit point. This mesh can be stored as part of the terrain map. Other representations of the LiDAR points making up the terrain map are also possible. The vehicle processing system can update the terrain map with additional hit points from LiDAR scans as they are processed using the techniques described herein.

The method 300 can include presenting a graphical representation of the terrain map in a graphical user interface of the aerial vehicle (ACT 310). The graphical representation of the terrain map can be a 2.5D rendering or a 3D rendering of the terrain map. The graphical user interface that includes the graphical representation of the terrain map can be displayed on display devices (e.g., the display devices 130) of the aerial vehicle. The graphical representation of the terrain map can be updated at the display devices in real-time, or as new sensor data is captured by the sensors. As the LiDAR scans the environment in front of the aerial vehicle, the terrain map can be generated and presented prior to the aerial vehicle navigating over the terrain, in real-time.

Figure 4:
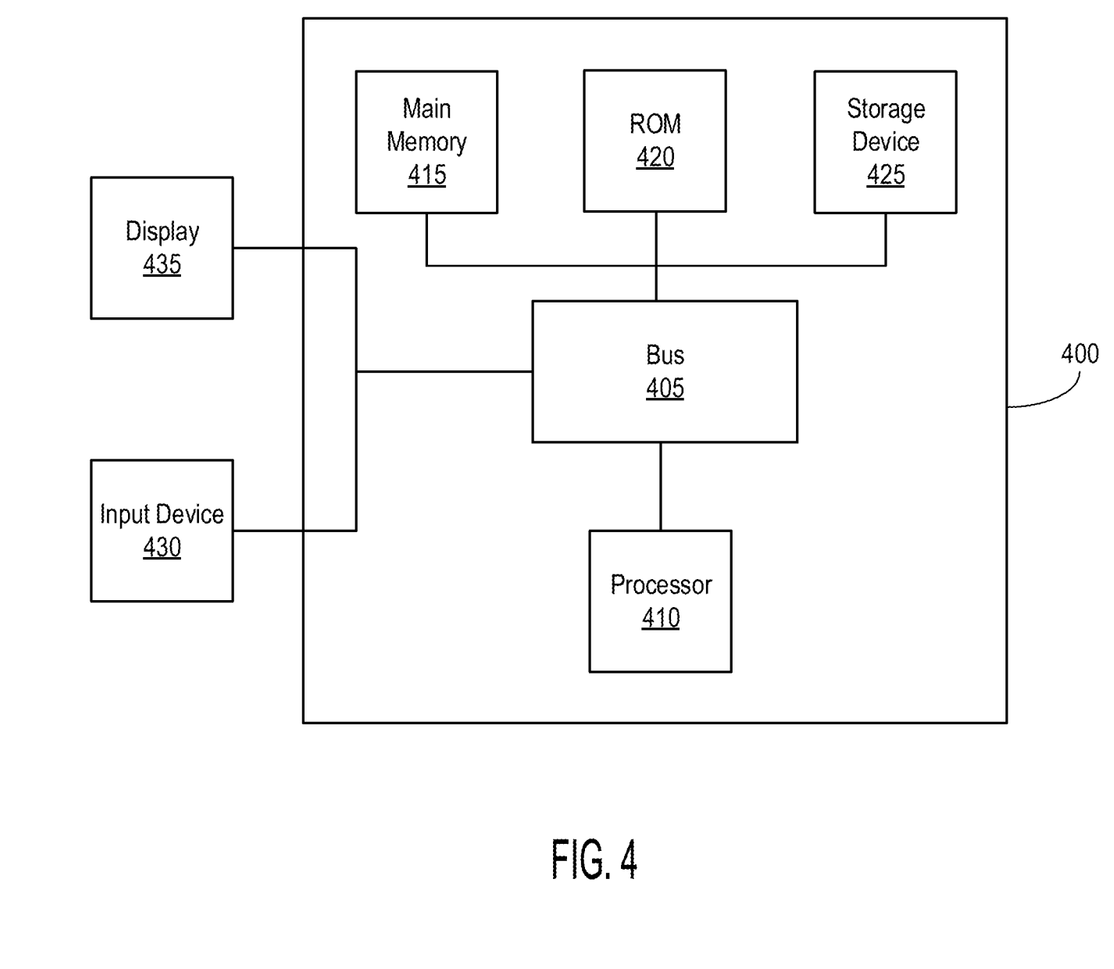
FIG. 4 illustrates a block diagram of an example computer system useful in implementing one or more components detailed herein.

Referring now to FIG. 4, depicted is a block diagram of an example computer system 400. The computer system or computing device 400 can include or be used to implement the system 100, or its components such as the vehicle processing system 110. The computing system 400 includes at least one bus 405 or other communication component for communicating information and at least one processor 410 or processing circuit coupled to the bus 405 for processing information. The computing system 400 can also include one or more processors 410 or processing circuits coupled to the bus 405 for processing information. The computing system 400 also includes at least one main memory 415, such as a random access memory (RAM) or other dynamic storage device, coupled to the bus 405 for storing information, and instructions to be executed by the processor 410. The computing system 400 can further include at least one read only memory (ROM) 420 or other static storage device coupled to the bus 405 for storing static information and instructions for the processor 410. A storage device 425, such as a solid state device, magnetic disk, or optical disk, can be coupled to the bus 405 to persistently store information and instructions.

The computing system 400 can be coupled via the bus 405 to a display 435, such as a liquid crystal display, or active matrix display, for displaying information to a user such as an administrator of the data processing system. An input device 430, such as a keyboard or voice interface can be coupled to the bus 405 for communicating information and commands to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the display devices 130, or other components of FIG. 1.

The processes, systems, and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement can also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

Some of the description herein emphasizes the structural independence of the aspects of the system components and illustrates one grouping of operations and responsibilities of these system components. Other groupings that execute similar overall operations are understood to be within the scope of the present application. Modules can be implemented in hardware or as computer instructions on a non-transient computer readable storage medium, and modules can be distributed across various hardware- or computer-based components.

The systems described above can provide multiple ones of any or each of those components, and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to a suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device," "component," or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a GPU, or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services and/or distributed computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), a GPU, or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation.

Any implementation can be combined with any other implementation, inclusively or exclusively, in any manner consistent with the aspects and implementations disclosed herein.

References to "or" can be construed as inclusive so that any terms described using "or" can indicate any of a single, more than one, and all of the described terms. For example, a reference to "at least one of 'A' and 'B'" can include only "A," only "B," as well as both "A" and "B." Such references used in conjunction with "comprising" or other open terminology can include additional items.

Where technical features in the drawings, detailed description or any claims are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, and orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

The systems and methods described herein can be embodied in other specific forms without departing from the characteristics thereof. Scope of the systems and methods described herein is thus indicated by the appended claims, rather than the foregoing description, and changes that come within the meaning and range of equivalency of the claims are embraced therein.

While this specification contains many specific implementation details, these should not be construed as limitations on the scope of any inventions or of what can be claimed, but rather as descriptions of features specific to particular embodiments of particular aspects. Certain features described in this specification in the context of separate embodiments can also be implemented in combination in a single embodiment. Conversely, various features described in the context of a single embodiment can also be implemented in multiple embodiments separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the embodiments described above should not be understood as requiring such separation in all embodiments, and it should be understood that the described program components and systems can generally be integrated in a single software product or packaged into multiple software products.

Thus, particular embodiments of the subject matter have been described. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method of ray-tracing for terrain mapping, the method comprising:
   identifying, by one or more processors coupled to memory of an aerial vehicle, a plurality of points generated from data captured by a sensor of the aerial vehicle, each of the plurality of points corresponding to a respective altitude value indicating a respective altitude of a portion of terrain;
   determining, by the one or more processors, based on the respective altitude value of each of the plurality of points, a threshold altitude of the terrain;
   identifying, by the one or more processors, a boundary defined in part based on the threshold altitude of the terrain;
   generating, by the one or more processors, a terrain map for the terrain based on applying a ray-tracing process to the plurality of points, the ray-tracing process performed within the boundary from the plurality of points as respective sources to the aerial vehicle as a destination; and
   presenting, by the one or more processors, a graphical representation of the terrain map in a graphical user interface of the aerial vehicle.

2. The method of claim 1, wherein the sensor is a light-detection and ranging (LiDAR) sensor and the data comprises LiDAR signals.

3. The method of claim 2, wherein the LiDAR signals comprise signals received from distances ranging between 1 km from the aerial vehicle to 10 km from the aerial vehicle.

4. The method of claim 1, further comprising determining, by the one or more processors, based on the ray-tracing process, a plurality of hits on the terrain.

5. The method of claim 4, wherein determining the plurality of hits further comprises performing, by the one or more processors, a log odds computation based on a result of the ray-tracing process for the plurality of points.

6. The method of claim 1, wherein identifying the plurality of points comprises receiving, by the one or more processors, the data captured by a plurality of sensors.

7. The method of claim 1, wherein identifying the boundary comprises determining, by the one or more processors, based on the plurality of points, a maximum altitude value of the terrain as the threshold altitude.

8. The method of claim 1, wherein a maximum distance that ray-tracing is to be performed is based on a difference between the threshold altitude of the terrain and a second threshold of the terrain.

9. The method of claim 8, wherein the threshold altitude is a maximum altitude of the plurality of points, and the second threshold is a minimum altitude of the plurality of points.

10. The method of claim 1, wherein the terrain map is presented prior to the aerial vehicle navigating over the terrain.

11. A system of ray-tracing for terrain mapping, the system comprising:
   one or more processors coupled to memory of an aerial vehicle, the one or more processors configured to:
   identify a plurality of points generated from data captured by a sensor of the aerial vehicle, each of the plurality of points corresponding to a respective altitude value indicating a respective altitude of a portion of terrain;
   determine, based on the respective altitude value of each of the plurality of points, a threshold altitude of the terrain;
   identify a boundary defined in part based on the threshold altitude of the terrain;
   generate a terrain map for the terrain based on applying a ray-tracing process to the plurality of points, the ray-tracing process performed within the boundary from the plurality of points as respective sources to the aerial vehicle as a destination; and
   present a graphical representation of the terrain map in a graphical user interface of the aerial vehicle.

12. The system of claim 11, wherein the sensor is a light-detection and ranging (LiDAR) sensor and the data comprises LiDAR signals.

13. The system of claim 12, wherein the LiDAR signals comprise signals received from distances ranging between 1 km from the aerial vehicle to 10 km from the aerial vehicle.

14. The system of claim 11, wherein the one or more processors are further configured to determine, based on the ray-tracing process, a plurality of hits on the terrain.

15. The system of claim 14, wherein to determine the plurality of hits, the one or more processors are further configured to perform a log odds computation based on a result of the ray-tracing process for the plurality of points.

16. The system of claim 11, wherein to identify the plurality of points, the one or more processors are further configured to receive the data captured by a plurality of sensors.

17. The system of claim 11, wherein to identify the boundary, the one or more processors are further configured to determine, based on the plurality of points, a maximum altitude value of the terrain as the threshold altitude.

18. The system of claim 11, wherein a maximum distance that ray-tracing is to be performed is based on a difference between the threshold altitude of the terrain and a second threshold of the terrain.

19. An aerial vehicle, comprising:
   a sensor; and
   one or more processors, coupled to memory, to:
   identify a plurality of points generated from data captured by the sensor, each of the plurality of points corresponding to a respective altitude value indicating a respective altitude of a portion of terrain;
   determine, based on the respective altitude value of each of the plurality of points, a threshold altitude of the terrain;
   identify a boundary defined in part based on the threshold altitude of the terrain;
   generate a terrain map for the terrain based on applying a ray-tracing process to the plurality of points, the ray-tracing process performed within the boundary from the plurality of points as respective sources to the aerial vehicle as a destination; and
   present a graphical representation of the terrain map in a graphical user interface of the aerial vehicle.

20. The aerial vehicle of claim 19, wherein the sensor is a light-detection and ranging (LiDAR) sensor and the data comprises LiDAR signals.

* * * * *